June 17, 1958  E. E. MODES ET AL  2,838,943
HEAT MOTOR FOR PRODUCING ROTARY MOTION
Filed Dec. 9, 1955
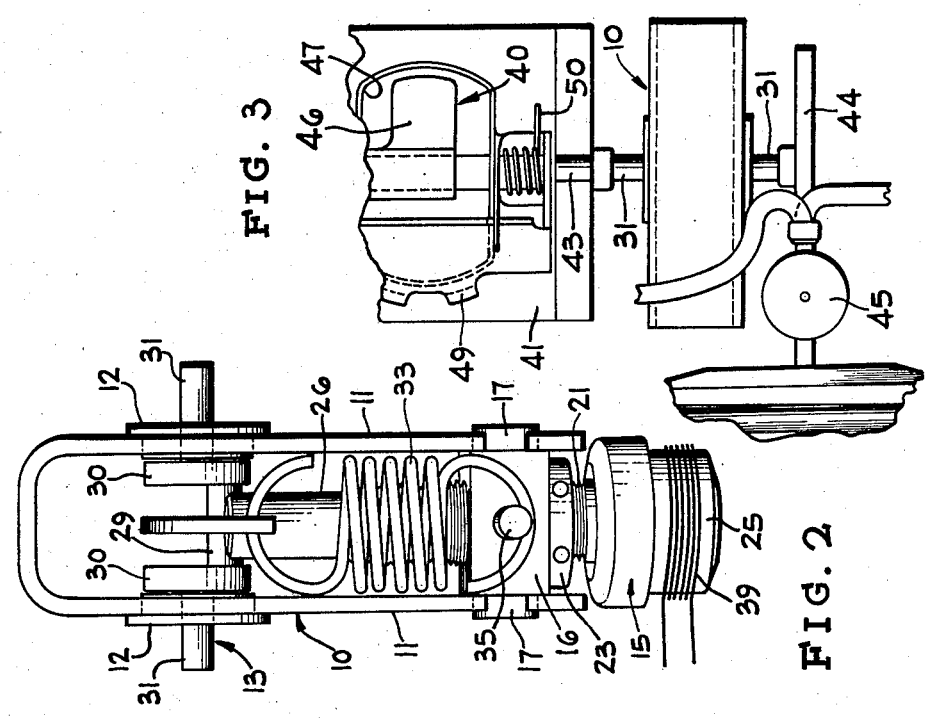
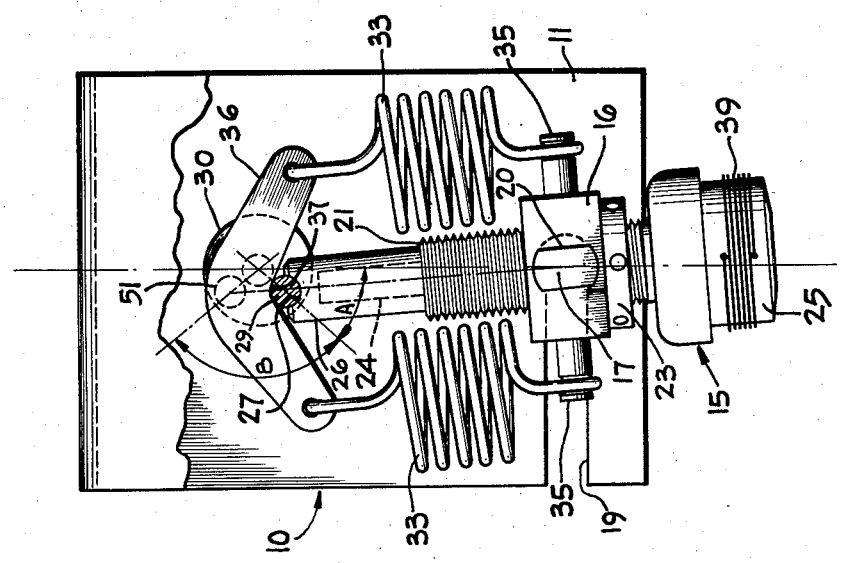
INVENTORS
EDWARD E. MODES
MULLAPUDI M. REDDI
WILLIAM E. LAUTERBACH
ATTORNEYS

United States Patent Office 2,838,943
Patented June 17, 1958

2,838,943

HEAT MOTOR FOR PRODUCING ROTARY MOTION

Edward E. Modes, Mullapudi M. Reddi, and William E. Lauterbach, Chicago, Ill., assignors to The Dole Valve Company, Chicago, Ill., a corporation of Illinois Application December 9, 1955, Serial No. 552,054

6 Claims. (Cl. 74—99)

This invention relates to improvements in heat motors and more particularly relates to such motors by expansion of a thermal medium.

A principal object of the invention is to provide a novel and improved form of heat motor having a high initial torque and particularly adapted to provide the power to break ice cubes loose from an ice cube tray and to then remove the ice cubes therefrom.

Another object of the invention is to provide a novel and improved form of heat motor including a thermal element having an extensible power member in which the rectilinear movement of the thermal element is transferred into rotational motion with a varying torque, the initial torque of which is relatively high compared with the final torque delivered by the motor.

Still another object of the invention is to provide a novel and improved form of heat motor in which a high motion solid fill type of thermal element is rockingly carried in a casing and is cyclicly heated to extensibly move the power member of the thermal element, in which the power member of the thermal element has operative connection with a crank transferring the rectilinear movement of the power member to rotational movement with a varying torque, and in which a novel form of return spring connection is provided to return the power member and crank to their initial starting positions.

Another and important object of the invention is to provide a simple and improved form of heat motor particularly adapted to eject ice cubes from the tray of an ice cube maker having a solid fill high motion type of thermal element heated by resistor heat to effect extensible movement of a power member of the thermal element, and adjustably connected to a motion transferring means for transferring the linear motion of the power member to rotational motion having a high initial starting torque, dropping off to a lower final torque, together with an adjustable connection for the thermal element, for adjustably moving the thermal element with respect to the motion transferring means, to vary the degree of rotational motion thereof and the starting torque of the heat motor.

These and other objects of the invention will appear from time to time as the following specification proceeds and with reference to the accompanying drawings wherein;

Figure 1 is a side elevational view of a heat motor constructed in accordance with our invention, with part of the casing therefor broken away and other parts shown in section;

Figure 2 is an end view of the heat motor shown in Figure 1; and

Figure 3 is a fragmentary diagrammatic view showing the heat motor connected with the ejector mechanism of an ice cube maker and a metering device for metering water to the ice cube tray.

In the embodiment of the invention illustrated in Figures 1 and 2 of the drawings, the heat motor is shown as being carried by a housing 10 generally U-shaped in end view and having parallel spaced side plates 11. The side plates 11 have aligned bearings 12 recessed therein, forming bearings for a crankshaft 13 operated by a thermal element 15, rockingly carried in said side plates for rocking movement about an axis parallel to the axis of the crank 13.

The mounting for the thermal element 15 in the side plates 11 is herein shown as being a collar or spider 16 having trunnion pins 17 extending outwardly therefrom and rockingly carried in the arcuate portions of keyhole slots 19 formed in said side plates.

As herein shown, the trunnion pins 17 have parallel flattened sides 20 slidably moveable along the rectilinear portions of the keyhole slots 19 into registry with the arcuate portions of said slots. The trunnion pins 17 may then be turned in the arcuate portions of said slots to lock the spider or collar 16 therein, for rocking movement with respect thereto.

The collar 16 is internally threaded and has a cylinder 21 of the thermal element 15 threaded therein and forms an adjustable and rocking support for said thermal element. A lock nut 23 is provided to lock the thermal element in its adjusted position in the collar 16.

The thermal element 15 is shown as being a so-called power or high motion solid fill type of thermal element, such as is shown and described in the Vernet Patent No. 2,368,181, dated January 30, 1945. This thermal element has been selected for its compactness and simplicity, as well as its extreme power and relatively long range of travel of a power member or a piston 24 thereof, slidably guided in the cylinder 21 for extensible movement with respect thereto upon predetermined increases in temperature. In such types of thermal elements, a thermal medium (not shown) in the form of a fusible material is contained within a casing 25 for the thermal element and reacts against a membrane or deformable member (not shown), to extend the power member or piston 24 with respect to the cylinder 21 and casing 25, as the thermal medium reaches its fusion point. The thermal medium may be a wax alone or a wax containing a powdered metal heat conductor and a binder, the material used being selected for its melting or fusion point, and the fusion point thereof determining the temperature range of operation of the thermal element.

The piston 24 is shown as extending within a piston extension 26, abutting the top or outer side of the cylinder 21 when the thermal element is cool. The piston extension 26 has an arcuate recess 27 in its upper end extending transversely thereacross and having engagement with an eccentric shaft 29 of the crank shaft 13. The eccentric shaft 29 is shown as being carried in disks 30 at its opposite ends. The disks 30 are mounted on the inner ends of coaxial output shafts 31 of the crank shaft 13, which are journaled in the bearings 12. The crank shaft 13 and power member 24 are moved in a return direction upon cooling of the thermal element 15 by the bias of spaced tension springs 33, extending along each side of the power member 24 and hooked at their lower ends to pins 35 extending from the collar 16 at right angles to the trunnion pins 17. The springs 33 are hooked at their opposite ends to opposite ends of a yoke 36 shown as being in the form of a modified or flat angled V and having a recessed central arcuate portion 37 having slidable bearing engagement with the eccentric shaft 29 of the crankshaft 13.

A resistor heater 39 is shown as encircling the casing 25 of the thermal element 15. The heater 39 may be selectively energizable by a suitable switch means (not shown), such as, the temperature sensitive switch of an ice cube maker where the heat motor is to be used to eject the ice cubes of an ice cube maker, or by any other desired form of switch means operable to close a circuit to the resistor heater 39 to heat the casing 25 of thermal element 15 and effect extensible movement of the power member 24 with respect to the cylinder 21.

In setting the heat motor for operation, the initial position of the eccentric shaft 29 of the crank 13 may be set by adjusting the position of the cylinder 21 with respect to the spider 16 until a given angle A is obtained between a center line through the trunnion pins 17 and the output shafts 31, and a radial line through the center of output shafts 31 and the center of the eccentric shaft 29. The angle A may be varied to vary the degrees of the rotation of the crank 13 and also to vary the starting torque of the motor, it being evident that the closer the angle A is to 90°, the greater will be the starting torque. The extent of rotation of the crank is represented by angle B, shown in Figure 1 as extending between radial lines extending from the center of the crank 13 through the center of the eccentric shaft 29 when in its solid line position and when in the dotted line position of said shaft indicated by reference character 51.

In Figure 3 we have shown the heat motor 10 connected to operate the means for ejecting ice cubes from an ice cube tray 41, and to control the supply of water to the ice cube tray 41 for freezing. One output shaft 31 is shown as being coupled to a shaft 43 for an ice cube pusher blade 46 while the opposite output shaft 31 is shown as being connected with a cam 44 to rotatably drive said cam and operate a metering device 45 to meter a measured volume of water to the ice cube tray 41 at the end of ejecting operation, as in an application Serial No. 543,224 filed by Edward E. Modes on October 27, 1955 and entitled "Fluid Metering Device." The shaft 43 also has an ejector 49 freely mounted thereon and extending the length of the ice cube tray 41. The ejector 49 is engaged by an ice cube as the pusher 46 first frees and then pivots the ice cubes from the tray, and is moved by the cubes against a torsion spring 50 during the operation of removing ice cubes from the tray. The torsion spring 50 pivots the ejector 49 in an opposite direction from which it is moved by the ice cubes and pusher blade 46, and ejects the cubes beyond the edge of the tray as in an application filed by Edward E. Modes and Nicholas Miller, Serial No. 552,526, filed July 18, 1955, and entitled "Rotary Ice Cube Ejector Mechanism" and no part of our present invention so not herein shown or described further.

In our present device, when water in the ice cube tray 41 is frozen, a thermal element (not shown), sensing the temperature of the ice in the ice cube tray may effect the closing of an electric switch to complete a circuit to the resistance heater 39 and energize the same. This will cause an increase in temperature of the fusible thermally expansible material within the casing 25 and effect extension of the power member or piston 24 from the cylinder 21. The extension 26 of the piston or power member 24 reacting against the eccentric shaft 29 of the crank 13 will pivot said shaft and crank upon extension of the power member 24, in a clockwise direction from the solid line position shown in Figure 4 through angle B to the dotted line position indicated by reference character 51.

During movement of eccentric shaft 29 through angle B the pushers 46 will be brought into engagement with the ice cubes with the high torque necessary to free the ice cubes from cavities 47 and will then pivot said ice cubes into engagement with the ejector 49 and continue pivotal movement of said ice cubes and ejector with a diminishing torque for removal from the cavities 47. The return springs 33 will then return the crank 13 and power member 24 to the solid line position shown in Figure 1 and position the pusher 46 into the initial position shown in Figure 3. The cam 44 will then operate the metering device 45 to meter a measured volume of water to the tray 46 for a next succeeding freezing operation.

It should herein be understood that while we have shown the heat motor 10 as being connected to supply the power for removing ice cubes from an ice cube tray, and that while said heat motor is particularly adapted to such a use, due to its simplicity and high starting torque, giving the necessary power to free the ice cubes from the ice cube tray for removal therefrom, that the heat motor of my invention may be used for various other purposes and particularly such uses as require an initial high torque and thereafter require a lower or diminishing torque.

It may further be seen that we have provided a simple and efficient heat motor in which power is obtained from a a thermal element of the type having a rectilinearly movable power member by the periodic heating and cooling of the thermal element, and that the heat motor may readily be adjusted for various degrees of rotation and starting torques, it being understood that the starting torque is determined by the angular relation between the power member of the thermal element and a radial line extending through to the center of the crank when the thermal element is cool, and that this angle may readily be varied by adjustably moving the thermal element along the collar or spider 16 and then locking the thermal element in the proper position with respect thereto.

It may further be understood that while we have shown an electrically heated power type of thermal element as a source of power, that any other type of thermal element may be used in place thereof, provided the thermal element has an extensible or rectilinearly movable power member to effect the power to drive the crank 13, the type of thermal element used depending solely upon the power required to perform the desired work.

It will be understood that various modifications and variations of the present invention may be effected without departing from the spirit and scope of the novel concepts thereof.

We claim as our invention:

1. In a heat motor, a thermal element, a housing therefor, means mounting said thermal element in said housing for rocking movement with respect thereto, a crank journaled in said housing in spaced relation with respect to said thermal element for rotatable movement about an axis parallel to the axis of rocking movement of said thermal element, said thermal element having an extensible power member extensible along an axis perpendicular to the axis of rocking movement of said thermal element, means selectively operable to heat said thermal element and effect extensible movement of said power member with respect thereto, an engaging connection between said power member and said crank, and means retaining said crank to said power member comprising a rigid yoke having engagement with said crank and spring means maintaining said yoke in engagement with said crank and moving said power member in a return direction upon cooling of said thermal element.

2. In a heat motor, a housing, a collar rockingly carried in said housing, a crank journaled in said housing for rotational movement with respect thereto about an axis parallel to the axis of rocking movement of said collar and spaced therefrom, a thermal element adjustably carried in said collar and having an extensible power member, an operative connection between said power member and crank for rotatably moving said crank upon extensible movement of said thermal element, a rigid yoke engaging the opposite side of said crank from said power member and extending beyond opposite sides of said crank, spring means connected between said thermal element and opposite ends of said yoke for maintaining said crank in engagement with said power member and returning said crank and power member upon predetermined reductions in temperature, and electrically energizable means selectively energizable to heat said thermal element and effect extensible movement of said power member and rotatable movement of said crank.

3. In a heat motor, a housing, a collar rockingly carried in said housing, a crank journaled in said housing for rotatable movement with respect thereto about an axis parallel to the axis of rocking movement of said collar and spaced from said collar, a thermal element adjustably carried in said collar, means holding said thermal element in adjusted relation with respect to said collar, said thermal element having an extensible power member having operative engagement with said crank, electrically energizable means for heating said thermal element to effect extensible movement of said power member, a rigid yoke having engagement with said crank on the opposite side thereof from said power member and extending to opposite sides of said crank, and separate springs connected between each end of said yoke and said collar for maintaining said crank in engagement with said power member and returning said power member and rotatably moving said crank on its return stroke.

4. In a heat motor, a housing, a collar having trunnion pins extending therefrom and rockingly mounted in said housing, a crank journaled in said housing for rotatable movement with respect thereto about an axis parallel to the axis of rocking movement of said collar and spaced from said collar, a thermal element having a casing containing a thermally expansible material, a cylinder extending from said casing and a power member slidably guided in said cylinder, a heater coil extending about said casing and energizable to heat said thermal element and effect extensible movement of said power member with respect to said cylinder, means mounting said cylinder in said collar for adjustable movement with respect to the axis for rotation of said crank to vary the degree of rotational movement of said crank, means for locking said cylinder in fixed relation with respect to said collar, an engaging connection between said power member and crank, a yoke having a central recessed portion having bearing engagement with said crank in opposed relation with respect to said power member, and two springs connected between opposite ends of said yoke and said collar for returning said power member and rotatably-moving said crank on its return stroke upon cooling of said thermal element.

5. In a heat motor, a housing having parallel side walls, a crank journaled between said side walls adjacent on end thereof, a collar rockingly mounted between said side walls adjacent the opposite end thereof for rocking movement about an axis parallel to the axis of rocking movement of said crank, a thermal element having a cylinder and power member extensible therefrom upon certain increases in temperature, an operative connection between said power member and said crank for rotatably moving said crank upon extensible movement of said power member, a threaded connection between said cylinder and said collar rockingly mounting said cylinder thereon for adjustment with respect thereto to vary the degree of rotation of said crank, electrically energizable means for heating said thermal element to effect extensible movement of said power member with respect to said cylinder and rotatable movement of said crank, and spring means connected between said thermal element and said crank for returning said power member and reversing the direction of rotation of said crank upon predetermined reductions in temperature.

6. In a heat motor, a housing having parallel spaced side walls, a crank journaled in said side walls for rotatable movement with respect thereto, a collar rockingly carried in said side walls for rocking movement about an axis parallel to the axis of rotation of said crank and spaced therefrom, a thermal element mounted in said collar and having a cylinder and a power member extensible therefrom upon predetermined increases in temperature, an engaging connection between said power member and said crank to effect rotation of said crank to effect rotation of said crank in one direction upon extensible movement of said power member, a threaded connection between said cylinder and said collar supporting said thermal element for adjustable movement with respect to said crank to adjust the extent of angular movement of said crank as selected, electrically energizable means for heating said thermal element to effect extensible movement of said power member, a rigid yoke having engagement with said crank on the opposite side thereof from said power member for maintaining said crank in engagement with said power member, said yoke extending to opposite sides of said crank, and spring means connected between said thermal element and opposite ends of said yoke for maintaining said yoke in engagement with said crank and returning said power member and rotatably moving said crank on its return stroke.

References Cited in the file of this patent

UNITED STATES PATENTS

| | | |
|---|---|---|
| 64,940 | Bird | May 21, 1867 |
| 885,878 | Skirrow | Apr. 28, 1908 |
| 2,368,181 | Vernet | Jan. 30, 1945 |
| 2,512,212 | Molotzak | June 20, 1950 |